United States Patent
Yamamoto et al.

(10) Patent No.: US 9,311,902 B2
(45) Date of Patent: Apr. 12, 2016

(54) METHOD OF FABRICATING BOW STICK OF STRINGED INSTRUMENT AND BOW STICK OF STRINGED INSTRUMENT

(71) Applicant: Yamaha Corporation, Hamamatsu-Shi (JP)

(72) Inventors: Akio Yamamoto, Hamamatsu (JP);
Kazushi Nakai, Hamamatsu (JP);
Tatsuya Hiraku, Hamamatsu (JP);
Toshiharu Fukushima, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 346 days.

(21) Appl. No.: 13/663,415

(22) Filed: Oct. 29, 2012

(65) Prior Publication Data

US 2013/0111757 A1    May 9, 2013

(30) Foreign Application Priority Data

Nov. 2, 2011   (JP) ................................ 2011-241461

(51) Int. Cl.
*G10D 3/16*  (2006.01)

(52) U.S. Cl.
CPC .............. *G10D 3/16* (2013.01); *Y10T 29/49574* (2015.01)

(58) Field of Classification Search
CPC .................................. B21D 22/00; G01D 3/16
USPC ................. 29/896.22, 896.2; 84/282
See application file for complete search history.

(56) References Cited

U.S. PATENT DOCUMENTS

| | | | |
|---|---|---|---|
| 3,440,918 A * | 4/1969 | Wurlitzer | 84/282 |
| 3,979,992 A | 9/1976 | Gandillet | |
| 4,015,501 A * | 4/1977 | Schaller | 84/282 |
| 4,493,238 A | 1/1985 | Ricci | |
| 4,754,681 A * | 7/1988 | Maigret et al. | 84/282 |

FOREIGN PATENT DOCUMENTS

| | | |
|---|---|---|
| CA | 2045000 C | 2/1994 |
| DE | 19745759 A1 | 4/1999 |
| EP | 2 375 405 A2 | 10/2011 |
| FR | 2 269 166 A1 | 11/1975 |

(Continued)

OTHER PUBLICATIONS

European Search Report issued for EP 12007416.6, mailing date Nov. 28, 2013.

(Continued)

*Primary Examiner* — Richard Chang
(74) *Attorney, Agent, or Firm* — Blank Rome LLP

(57) ABSTRACT

A method of fabricating a bow stick includes winding a prepreg, in which a fiber is impregnated with a resin, on a mandrel with a diameter gradually decreasing toward a distal end, setting a semi-fabricated product, in which the prepreg is wound on the mandrel, into a mold and molding the semi-fabricated product in a shape corresponding to a cavity formed between the mold and the mandrel by heating and pressurizing the semi-fabricated product in the mold, and taking out the mandrel from a molded product molded in the shape corresponding to the cavity to acquire a long and hollow stick body. When adjusting at least one of a weight distribution, a center of gravity, and a weight of the stick body, the volume of the cavity is changed using the mandrel of which the diameter or the diameter variation is gradually changed in an axis direction.

3 Claims, 7 Drawing Sheets

(56) References Cited

FOREIGN PATENT DOCUMENTS

| | | |
|---|---|---|
| FR | 2 765 998 A1 | 1/1999 |
| JP | 44019189 | 8/1969 |
| JP | B-44-30899 | 12/1969 |
| JP | A-59-152493 | 8/1984 |
| JP | S60-169899 A | 9/1985 |
| JP | 2-264677 A | 10/1990 |
| JP | A-03-287300 | 12/1991 |
| JP | 09-117238 A | 5/1997 |
| JP | 11048318 A | 2/1999 |
| JP | 2002-84931 A | 3/2002 |
| JP | 3541756 B2 | 7/2004 |
| JP | 2005-27619 A | 2/2005 |
| JP | A-2008-529039 | 7/2008 |

OTHER PUBLICATIONS

Notice of Reasons for Rejection, Application No. 2011-241461, Jul. 13, 2015 (with translation).

Taiwan Office Action corresponding to application No. TW 101140388, mailing date Aug. 1, 2014 (English translation of Search Report only).

Notice of Allowance from JP 2011-241461 dated Feb. 9, 2016.

\* cited by examiner

METHOD OF FABRICATING BOW STICK OF STRINGED INSTRUMENT AND BOW STICK OF STRINGED INSTRUMENT

INCORPORATION BY REFERENCE

Priority is claimed on Japanese Patent Application No. 2011-241461, filed on Nov. 2, 2011, the content of which is incorporated herein by reference.

BACKGROUND OF THE INVENTION

1. Field of the Invention

The present invention relates to a method of fabricating a bow stick of a stringed instrument, and a bow stick of a stringed instrument.

2. Description of Related Art

Conventionally, wooden bow sticks (sticks) have been used for a bow of a stringed instrument such as a violin, a viola, a cello, or a contrabass. Among these, Pernambuco wood, which is hard with a high density, resistant to moisture, and has superior bending strength, has been used as a material suitable for a bow stick. However, Pernambuco wood availability has greatly decreased due to felling of trees and it has been difficult to get Pernambuco wood due to the recent international trade restrictions.

Therefore, as a substitute for a bow stick formed of a wood such as Pernambuco wood, a bow stick formed of fiber-reinforced plastics (FRP) using a composite material of a fiber and a resin, such as carbon fiber-reinforced plastics (CFRP) or glass fiber-reinforced plastics (GFRP) has been developed (for example, see Japanese Patent Granted Publication No. S44-19189).

Since a wooden bow stick is cut out from timber and is manually finished, completely-equal sticks cannot be fabricated. However, since an FRP bow stick is fabricated using the same material and mold, industrially-equal sticks can be fabricated with excellent reproducibility. When a wooden bow stick is fabricated, it is difficult to adjust, for example, a weight distribution, a center of gravity, and a weight of a bow stick without changing the outer shape or size, due to a difference in density of wood as a natural material.

As a method of fabricating a hollow fiber-reinforced resin molded product, a method which is called an internal pressure molding method is known (for example, see Japanese Unexamined Patent Application, First Publication No. H11-48318). In the internal pressure molding method, prepreg in which a fiber is impregnated with a non-cured resin is wound on a pressurizing bag formed of a flexible material and the resultant is set in a mold. Then, the mold is clamped and is then heated while inflating the pressurizing bag to push the prepreg into the inner surface of the mold. As a result, the prepreg can be shaped into a shape corresponding to the cavity formed between the mold and the pressurizing bag.

However, in the method of fabricating a hollow fiber-reinforced resin molded product using the internal pressure molding method, since the prepreg moves in the mold when swelling the pressurizing bag, the swelling of the pressurizing bag may be uneven.

Therefore, when a bow stick is fabricated using the internal pressure molding method, the shape of the cavity is not constant every molding and the weight distribution or the center of gravity of a bow stick to be molded is uneven.

On the other hand, the inventors of the present invention proposed a method of molding a hollow-structured product, in which an FRP prepreg is wound around a columnar metal mandrel having a tapered end and capable of springing back, the mandrel around which the FRP prepreg is wound is set into a mold having the outer portion of the hollow-structured product as a cavity, the mold is heated to acquire a molded product, and then the mandrel is removed therefrom (for example, see Japanese Patent No. 3541756).

When a bow stick is fabricated using the method of molding a hollow-structured product, the shape of the cavity formed between the mold and the mandrel can be kept even every molding at the time of molding. Therefore, it is possible to prevent unevenness in the weight distribution or the center of gravity of molded bow sticks.

Tastes of users (stringed instrument players') differ depending on a slight difference in the weight distribution, the center of gravity, the weight, and the like of the bow stick of a stringed instrument. Accordingly, when a bow stick formed of the FRP is fabricated, plural bow sticks which are finely adjusted in the weight distribution, the center of gravity, the weight, and the like of the bow sticks on the basis of tastes of the users need to be prepared.

SUMMARY OF THE INVENTION

The invention has been proposed in consideration of these circumstances and an object thereof is to provide a method of fabricating a bow stick of a stringed instrument, which can finely and easily adjust a weight distribution, a center of gravity, and a weight of the bow stick, and a bow stick of a stringed instrument of which a weight distribution, a center of gravity, and a weight are precisely adjusted.

According to an aspect of the invention, a method of fabricating a bow stick which is used in a stringed instrument and which is formed of fiber-reinforced plastics is provided, including the steps of: winding a prepreg, in which a fiber is impregnated with a resin, on a mandrel with a diameter gradually decreasing toward a distal end; setting a semi-fabricated product, in which the prepreg is wound on the mandrel, into a mold; molding the semi-fabricated product in a shape corresponding to a cavity formed between the mold and the mandrel by heating and pressurizing the semi-fabricated product in the mold; taking out the mandrel from a molded product molded in the shape corresponding to the cavity to acquire a long and hollow stick body; and adjusting at least one of a weight distribution, a center of gravity, and a weight of the bow stick of the stick body by changing the shape of the cavity using the mandrel of which the diameter or the diameter variation is gradually changed in an axis direction.

According to another aspect of the invention, a bow stick of a stringed instrument which is used in a stringed instrument and which is formed of fiber-reinforced plastics is provided, including a stick body that has an axial hole with a diameter decreasing toward a distal end and that is molded in a long and hollow shape, wherein at least one of a weight distribution, a center of gravity, and a weight of the bow stick of the stick body is adjusted by gradually changing the diameter or the diameter variation of the axis hole in an axis direction.

As described above, in the method of fabricating a bow stick of a stringed instrument according to the aspect of the invention, it is possible to finely and easily adjust the weight distribution, the center of gravity, and the weight of a stick body molded in a mold without changing the mold, by changing the volume of the cavity using a mandrel of which the diameter or the diameter variation is gradually changed in the axis direction.

In the bow stick of a stringed instrument according to the aspect of the invention, it is possible to precisely adjust the weight distribution, the center of gravity, and the weight of the stick body without changing the outer shape or size of the stick body by gradually changing the diameter or the diameter variation of the axial hole in the axis direction.

DETAILED DESCRIPTION OF THE INVENTION

Figure 1:
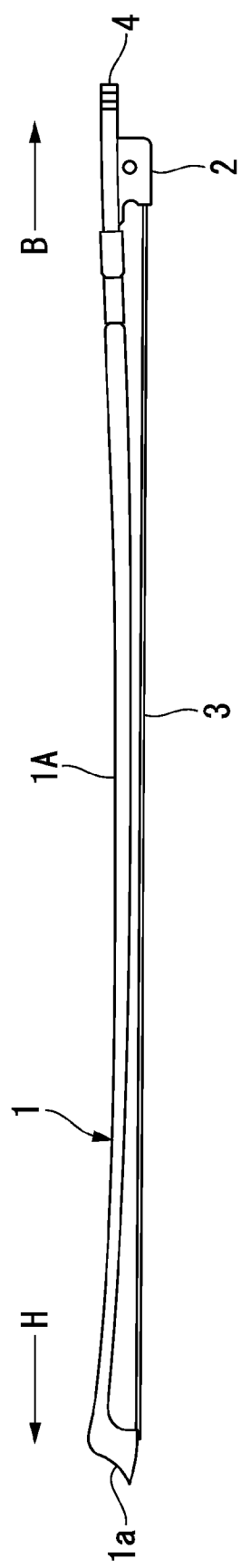
FIG. 1 is a plan view illustrating a bow of a stringed instrument according to an embodiment of the invention.

Hereinafter, a method of fabricating a bow stick of a stringed instrument and a bow stick of a stringed instrument according to the present invention will be described in detail with reference to the accompanying drawings.

In the drawings referred to in the following description, for the purpose of easy understanding of features, feature parts are schematically illustrated and the scale ratios of elements cannot be said to be the same as actual ones. Materials, sizes, and the like exemplified in the following description are only examples and the invention is not limited to the examples. The invention can be appropriately modified without departing from the concept of the invention.

In an embodiment of the invention, a bow of a stringed instrument shown in FIG. 1 is used for stringed instruments such as violins, violas, cellos, and contrabasses and is called a carbon bow employing, for example, a bow stick 1 formed of CFRP instead of a bow stick (stick) formed of wood such as Pernambuco wood.

In the bow of a stringed instrument shown in FIG. 1, a bow hair 3 is installed between a head portion 1a disposed at a distal end H of the bow stick 1 and a frog 2 disposed on the outer circumference of a base end B, and the tension of the bow hair 3 can be adjusted by turning a screw 4 disposed at the base end of the bow stick 1.

Figure 2A:
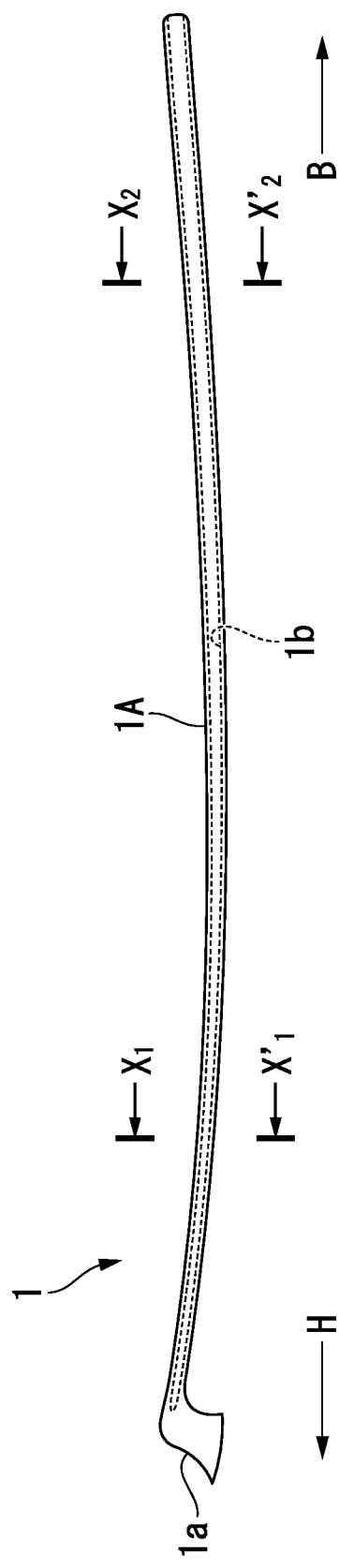
FIGS. 2A, 2B, and 2C are a plan view of a stick of the bow of a stringed instrument shown in FIG. 1, a cross-sectional view taken along line $X_1$-$X_1'$, and a cross-sectional view taken along line $X_2$-$X_2'$, respectively.
Figure 2C:
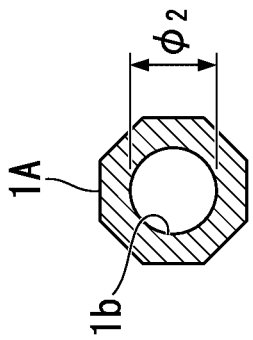
Figure 2B:
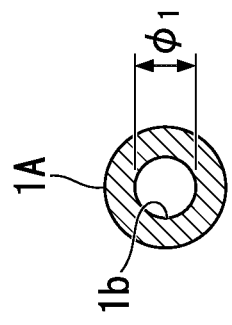

As shown in FIGS. 2A to 2C, the bow stick 1 includes a stick body 1A having a long and hollow shape and forming a body along with the head portion 1a. The stick body 1A has a bow shape bent back to the opposite side of the side on which the bow hair 3 is installed and can be bent (elastically deformed) in the opposite direction of the bent-back direction when the bow hair 3 is installed.

As shown in FIG. 2A, the stick body 1A has an outer shape in which the distal end H is thinner than the base end B as a whole except for the head portion 1a. As shown in FIG. 2B, the cross-section of the stick body 1A has a substantially circular shape over the axis direction, but a part of the base end has a substantially octagonal shape shown in FIG. 2C so as to improve the bending strength (rigidity) or designability of the stick body 1A.

An axial hole 1b having a substantially circular cross-section is formed in the axis direction at the center of the stick body 1A. The axial hole 1b has a so-called tapered shape with a diameter gradually decreasing from the base end B to the distal end H to correspond to the outer shape of the stick body 1A ($\phi_1 < \phi_2$).

The shape of the stick body 1A shown in FIGS. 2A to 2C is only an example, and the stick body 1A can be formed in an appropriate shape by appropriately changing the thickness or cross-sectional shape at each position in the axis direction in consideration of bending strength (rigidity), designability, or the like.

A method of fabricating the bow stick 1 will be described below with reference to FIGS. 3 to 7.

Figure 3:
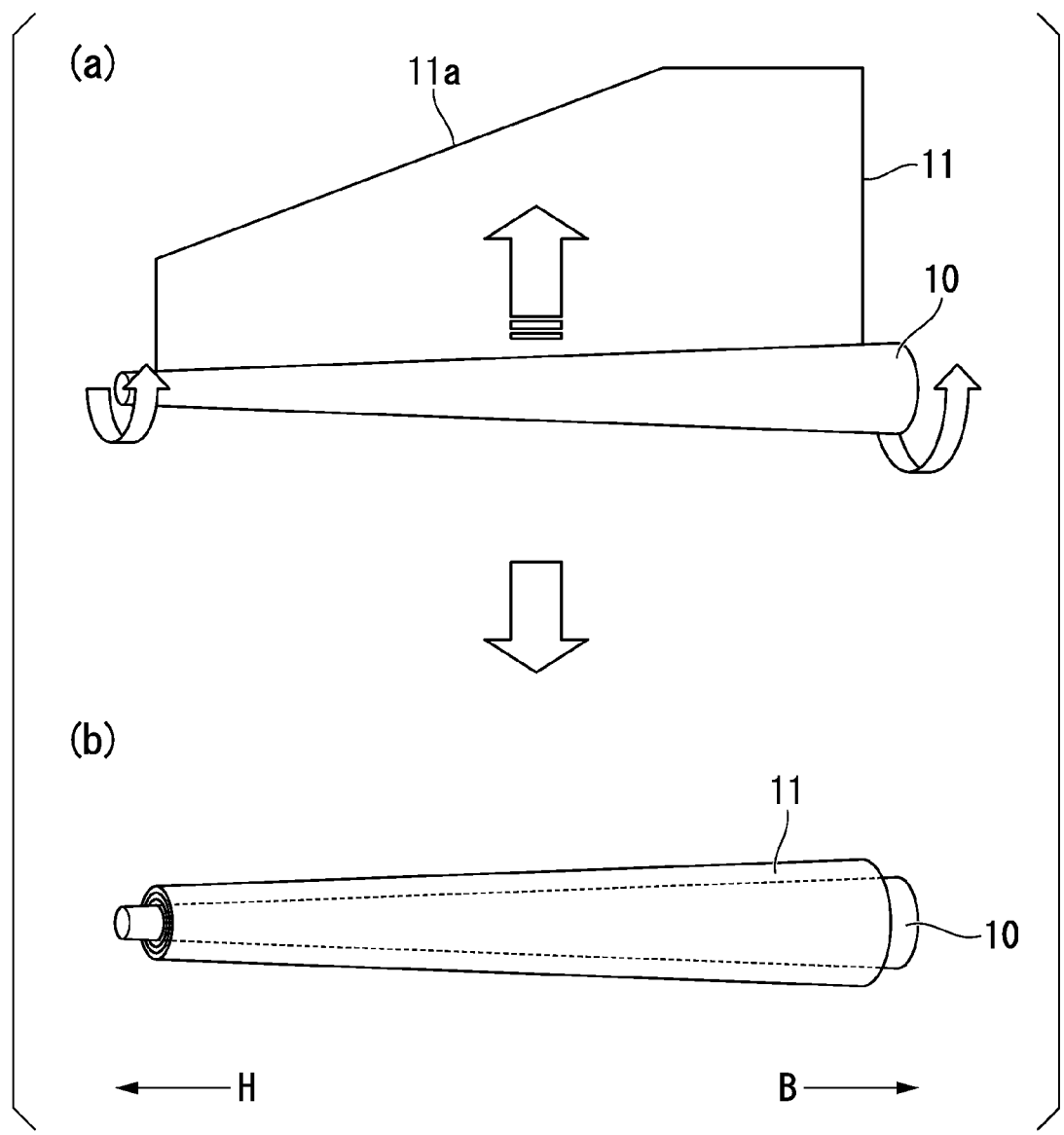
FIG. 3 is a perspective view of a method of fabricating the bow stick shown in FIGS. 2A to 2C, where (a) of FIG. 3 shows a state where prepreg is not wound on a mandrel and (b) of FIG. 3 shows a state where the prepreg is wound on the mandrel.

When fabricating the bow stick 1, first, a prepreg 11 is wound on a mandrel 10, as shown in (a) and (b) of FIG. 3.

The mandrel 10 defines a space (cavity) for shaping the wound prepreg 11 into the bow stick 1 along with a mold 20 shown in FIG. 5 and is described later and is formed of, for example, a metal rod capable of springing back. The mandrel 10 has a tapered shape with a diameter gradually decreasing from the base end B to the distal end H so as to form the axial hole 1b of the stick body 1A.

The prepreg 11 is a carbon fiber which is impregnated with a non-cured thermosetting resin. Examples of the prepreg 11 include a fiber in which carbon fibers are arranged in one direction and impregnated with a thermosetting resin, a fiber in which plain-woven, twill-woven, or sateen-woven carbon fibers are impregnated with a thermosetting resin, and a fiber in which short-fibered carbon fibers are cured with a thermosetting resin. Examples of the thermosetting resin include an epoxy resin and an unsaturated polyester resin.

In this embodiment, the area of the prepreg 11 wound on the mandrel 10 is adjusted in the axis direction to correspond to the shape of the cavity. Specifically, the weight of the bow stick 1 formed of the prepreg 11 is adjusted to correspond to the size (volume) of the cavity by changing the winding width distribution of the prepreg 11 wound on the mandrel 10.

As shown in (a) of FIG. 3, the weight of the stick body 1A to be molded can be changed on the basis of the area of the prepreg 11 wound on the mandrel 10. That is, when the thickness of the mandrel 10 is decreased to increase the area of the prepreg 11, the amount of the prepreg 11 wound on the mandrel 10 can be reduced to increase the weight of the stick body 1A to be molded. On the other hand, when the thickness of the mandrel 10 is increased to decrease the area of the prepreg 11, the amount of the prepreg 11 wound on the mandrel 10 can be reduced to decrease the weight of the stick body 1A to be molded.

The weight distribution and the center of gravity of the stick body 1A to be molded can be changed depending on the shape, that is, the winding width distribution, of the prepreg 11 wound on the mandrel 10. That is, by providing an inclined portion 11a to the distal end H of the prepreg 11 and adjusting the position or angle of the inclined portion 11a, the molded stick body 1A can be adjusted in the weight distribution and the center of gravity, as shown in (b) of FIG. 3.

The relationship between the shapes of the mandrel 10 and the prepreg 11 and the center of gravity of the stick body 11A to be molded will be described below with reference to FIG. 4.

Figure 4:
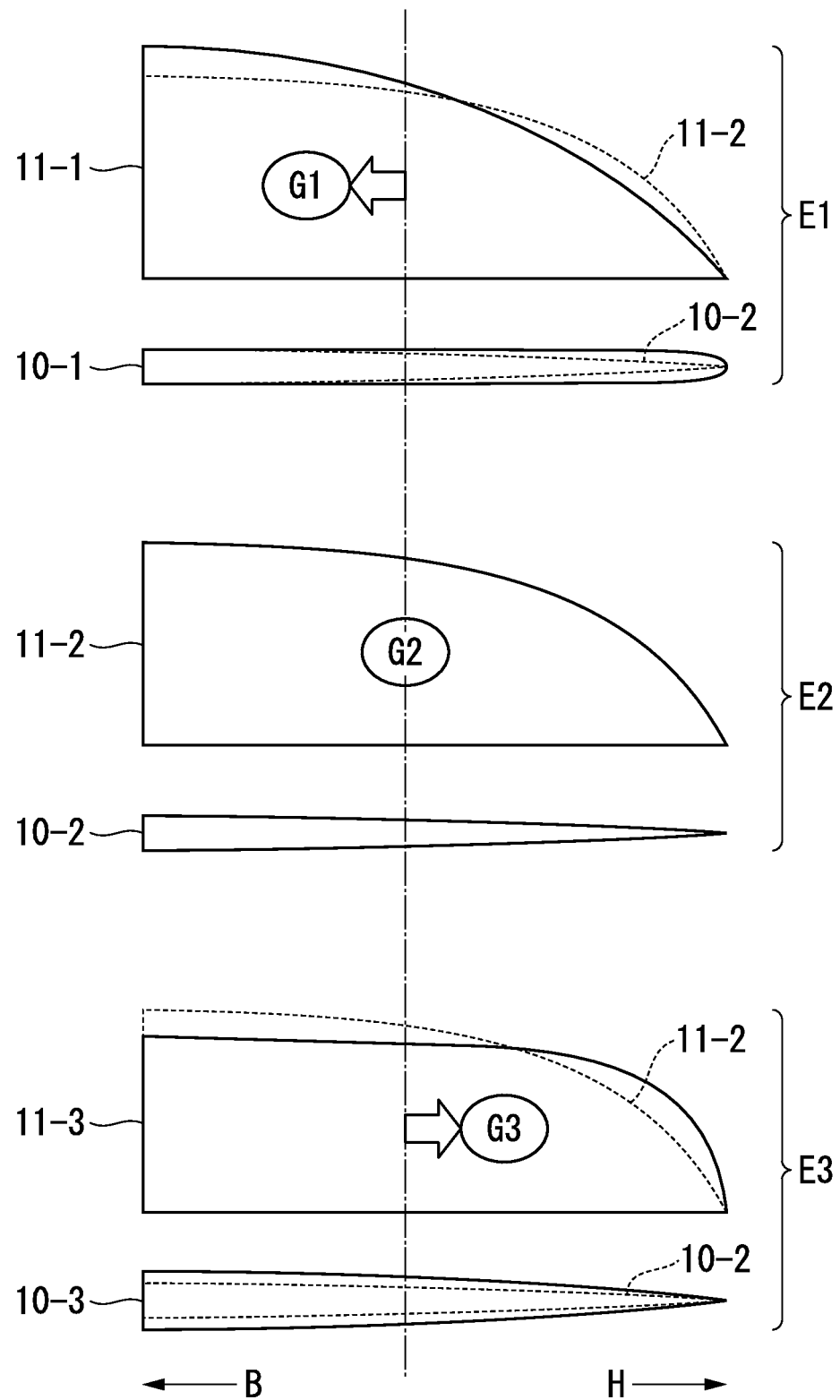
FIG. 4 is a diagram illustrating the relationship between the shapes of the mandrel and the prepreg and the center of gravity of a stick body to be molded.

When prepreg 11-2 having a cross-sectional shape shown in Second Example E2 is wound on a mandrel 10-2 having a planar shape shown in Second Example E2 in FIG. 4, the center of gravity of the stick body 1A to be molded is located at position G2.

When a stick body of which the center of gravity is located at position G1 closer to the base end B than position G2 is molded, the distal end H of a mandrel 10-1 is set to be thicker than the mandrel 10-2, as shown in First Example E1. In addition, the winding width distribution of prepreg 11-1 is changed to set the width of the base end B to be larger and to set the width of the distal end H to be smaller than those of the prepreg 11-2. The winding width distribution of prepreg 11-1 may also be changed to set only the width of the base end B to be larger that of the prepreg 11-2, or to set only the width of the distal end H to be smaller than that of the prepreg 11-2. The stick body 1A formed by winding the prepreg 11-1 on the mandrel 10-1 has the same outer shape as in Second Example E2, but the center of gravity thereof is located at position G1 closer to the base end B.

When a stick body of which the center of gravity is located at position G3 closer to the distal end H than position G2 is molded, the base end B of a mandrel 10-3 is set to be thicker than the mandrel 10-2, as shown in Third Example E3. In addition, the winding width distribution of prepreg 11-3 is changed to set the width of the base end B to be smaller and to set the width of the distal end H to be larger than those of the prepreg 11-2. The winding width distribution of prepreg 11-3 may also be changed to set only the width of the base end B to be smaller than that of the prepreg 11-2, or to set only the width of the distal end H to be larger than that of the prepreg 11-2. The stick body 1A formed by winding the prepreg 11-3 on the mandrel 10-3 has the same outer shape as in Second Example E2 but the center of gravity is located at position G3 closer to the distal end H.

When adjusting the winding width distribution of the prepreg 11, the prepreg 11 which is divided into plural parts may be stacked and wound on the mandrel 10 so as to obtain a winding width distribution corresponding to the area and shape of the prepreg 11. In this case, the amount of the prepreg 11 wound on the mandrel 10 can be adjusted in the axis direction.

Figure 6:
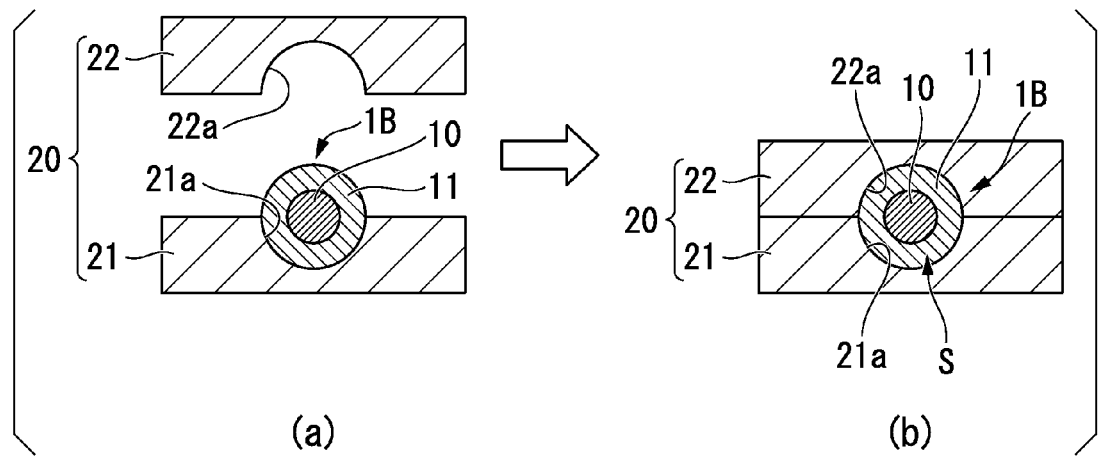
FIG. 6 is a cross-sectional view illustrating the method of fabricating the bow stick shown in FIGS. 2A to 2C, where (a) of FIG. 6 shows a state where a semi-fabricated product is set into one mold and (b) of FIG. 6 shows a state where the mold is clamped.

As shown in (a) of FIG. 6, a semi-fabricated product 1B in which the prepreg 11 is wound on the mandrel 10 is installed in a mold 20.

Figure 5:
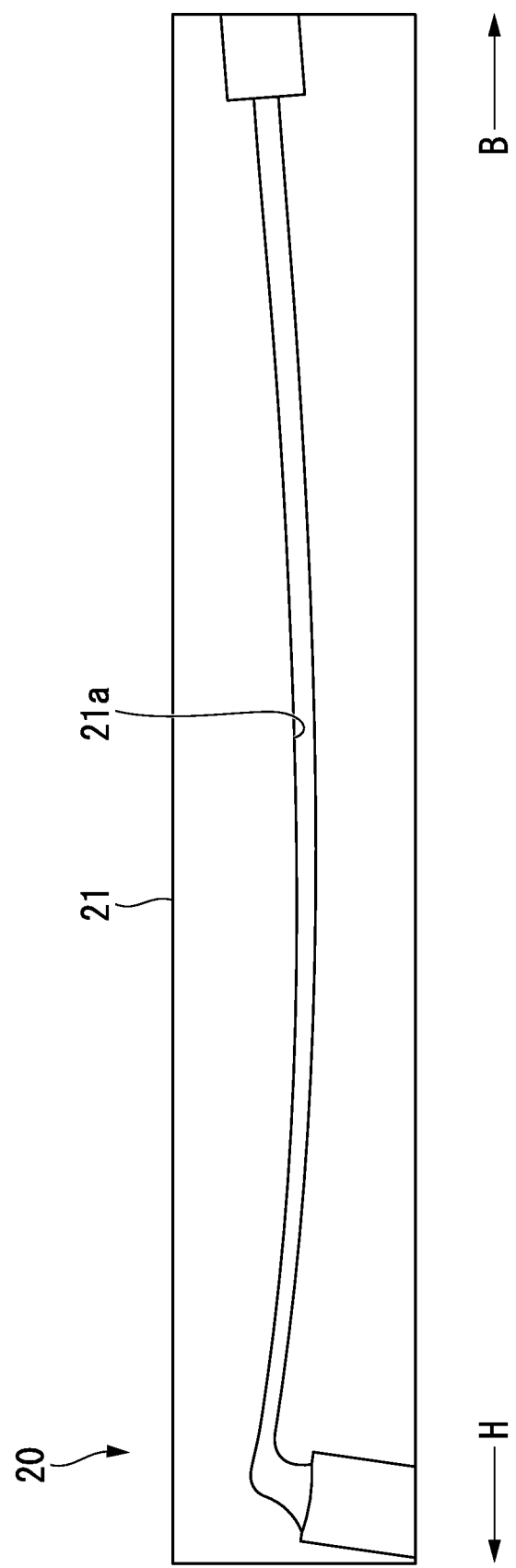
FIG. 5 is a plan view illustrating one mold used to fabricate the bow stick shown in FIGS. 2A to 2C.

As shown in FIG. 5 and (a) and (b) of FIG. 6, the mold 20 defines the outer shape of the stick body 1A (the bow stick 1) and includes a pair of lower mold 21 and upper mold 22 divided in the vertical direction. The lower mold 21 and the upper mold 22 mold the stick body 1A (the bow stick 1) to be symmetrical with a dividing plane along the axis direction, and concave portions 21a and 22a corresponding to the outer shape of the stick body 1A (the bow stick 1) are formed on the opposed surfaces thereof.

The mold 20 forms a space corresponding to the outer shape of the stick body 1A by causing the concave portions 21a and 22a to face each other when fitting the lower mold 21 and the upper mold 22 with each other.

The lower mold 21 and the upper mold 22 have the same shape except that the concave portions 21a and 22a are formed symmetrically, only one mold 20 (the lower mold 21) is shown in FIG. 5.

The mold 20 is clamped as shown in (b) of FIG. 6, by setting the semi-fabricated product 1B into the concave portion 21a of the lower mold 21 and then fitting the lower mold 21 and the upper mold 22 with each other as shown in (a) of FIG. 6.

At this time, a cavity S having a shape corresponding to the stick body 1A (the bow stick 1) is formed between the mold 20 and the mandrel 10. The semi-fabricated product 1B fills the mold 20.

After the clamping, the semi-fabricated product 1B is heated and pressurized in the mold 20. As a result, the thermosetting resin in the prepreg 11 of the semi-fabricated product 1B is cured to mold the prepreg 11 in a shape corresponding to the cavity S.

Figure 7:
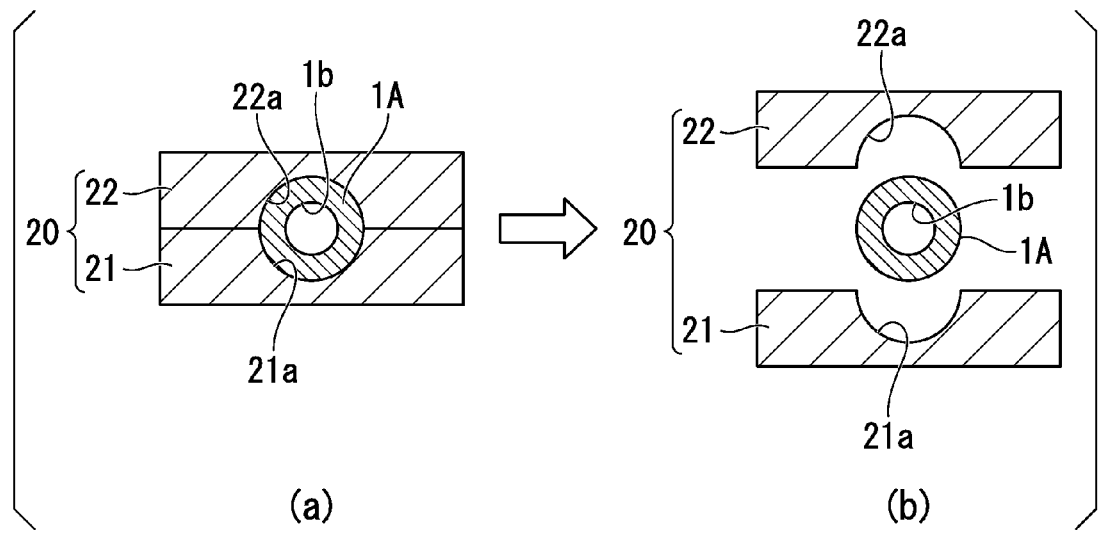
FIG. 7 is a cross-sectional view illustrating the method of fabricating the bow stick shown in FIGS. 2A to 2C, where (a) of FIG. 7 shows a state where the mandrel is taken out from a molded product (stick body) and (b) of FIG. 7 shows a state where the stick body (bow stick) is released from the mold.

As shown in (a) and (b) of FIG. 7, the mandrel 10 is then taken out from the molded product, that is, the stick body 1A, molded in the shape corresponding to the cavity S. Thereafter, by releasing the fitting of the lower mold 21 and the upper mold 22, the stick body 1A (the bow stick 1) can be released from the mold 20. The mandrel 10 may be taken out from the stick body 1A after releasing the stick body 1A from the mold 20.

Through these processes, it is possible to fabricate the bow stick 1 shown in FIG. 2A.

Although not shown in the drawing, the head portion 1a of the bow stick 1 is molded to form a body along with the stick body 1A, by setting a semi-fabricated product 1B, in which prepreg is wound on a core, into the mold 20 and then heating and pressurizing the semi-fabricated product along with the semi-fabricated product 1B in the mold 20.

In the method of fabricating the bow stick 1, the volume and the shape of the cavity S are changed using the mandrel 10 of which the diameter or the diameter variation (the taper angle) is gradually changed in the axis direction when adjusting at least one of the weight distribution, the center of gravity, and the weight of the stick body 1A.

Figure 8A:
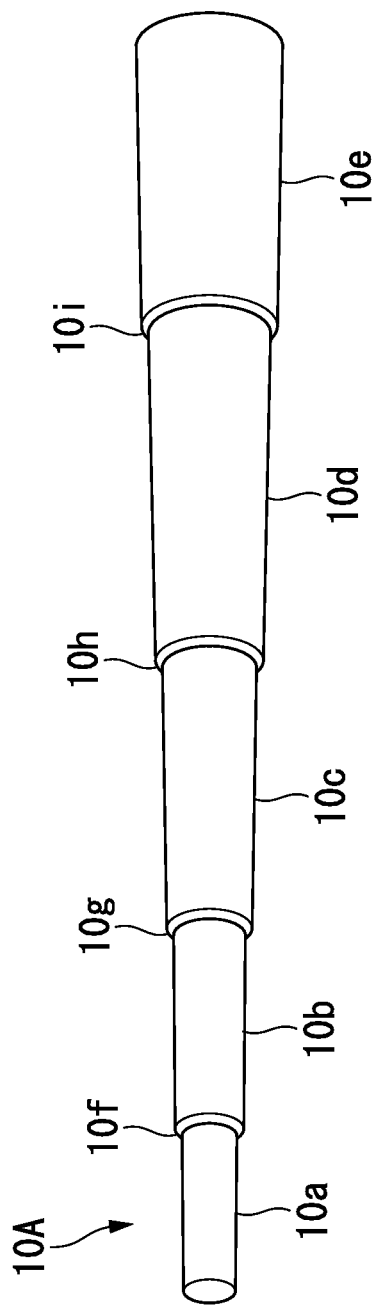
FIG. 8A is a schematic diagram illustrating an example where the diameter of a mandrel is gradually changed in the axis direction and FIG. 8B is a schematic diagram illustrating an example where the taper angle of a mandrel is gradually changed in the axis direction.

Specifically, in the above-mentioned embodiment, a mandrel 10A of which the diameter is gradually changed in the axis direction as schematically shown in FIG. 8A can be employed. In the mandrel 10A, parts 10a to 10e in which the diameter gradually increases from the distal end H to the base end B are arranged in the axis direction with steps 10f to 10i interposed therebetween. That is, the taper angles of the parts 10a to 10e are equal, but the diameters of the parts 10a to 10e are changed by disposing the steps 10f to 10i at every predetermined distance.

Figure 8B:
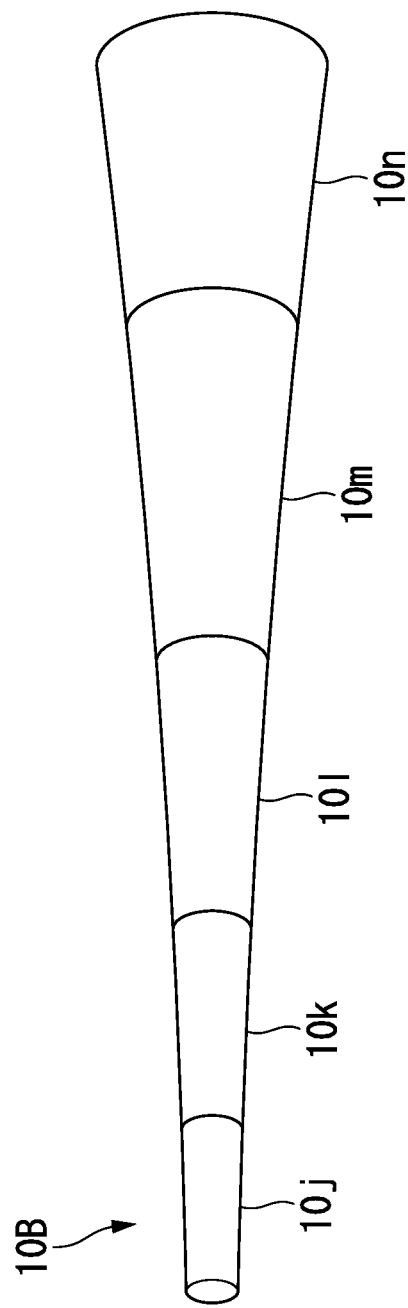

In this embodiment, a mandrel 10B of which the taper angle is gradually changed in the axis direction as schematically shown in FIG. 8B can be employed. The mandrel 10B includes parts 10j to 10n in which the taper angle gradually increases from the distal end H to the base end B. That is, the taper angles of the parts 10j to 10n are different and the taper angles of the parts 10j to 10n are changed every predetermined distance.

The mandrel 10B is more excellent in reproducibility and precision than the mandrel 10A.

The volume and the shape of the cavity S can be changed by adjusting the diameters of the parts 10a to 10e and 10j to 10n or the diameter variations (the taper angles) in the mandrels 10A and 10B or the lengths (the intervals of the steps 10f to 10i) of the parts 10a to 10e and 10j to 10n.

The winding width distribution of the prepreg 11 is adjusted to correspond to the changes in volume and shape of the cavity S. That is, the area of the prepreg 11 wound on the mandrel 10A or 10B is adjusted in the axis direction to correspond to the volume and the shape of the cavity S.

As a result, it is possible to finely and easily adjust the weight distribution, the center of gravity, the weight, and the like of the stick body 1A molded in the mold 20 without changing the mold 20. It is also possible to obtain a bow stick 1 in which the weight distribution, the center of gravity, the weight, and the like of the stick body 1A are precisely adjusted without changing the outer shape or the size of the stick body 1A.

As described above, in the method of fabricating the bow stick 1, it is possible to finely and easily adjust the weight distribution, the center of gravity, and the weight of the stick body 1A molded in the mold 20 without changing the mold 20, by changing the volume and the shape of the cavity S using the mandrel 10 of which the diameter or the diameter variation (the taper angle) is gradually changed in the axis direction.

In the bow stick 1, it is possible to precisely adjust the weight distribution, the center of gravity, and the weight of the stick body 1A without changing the outer shape or the size of the stick body 1A, by gradually changing the diameter or the diameter variation (the taper angle) of the axial hole 1b in the axis direction.

Therefore, according to this embodiment, plural bows for a stringed instrument in which the weight distribution, the center of gravity, the weight, and the like of the bow stick 1 are finely adjusted can be provided to correspond to tastes of users (stringed instrument players') using the bow for a stringed instrument shown in FIG. 1. A user can select and use a bow based on his or her taste.

The invention is not limited to the above-mentioned embodiment, but may be modified in various forms without departing from the concept of the invention.

That is, the shapes of the mandrels 10A and 10B shown in FIGS. 8A and 8B are only examples of the invention, and the invention is not limited to the shapes of the mandrels 10A and 10B.

For example, in the mandrel 10A shown in FIG. 8A, the arrangement or the number of the parts 10a to 10e with a varying diameter and the steps 10f to 10i can be appropriately changed. In the mandrel 10A shown in FIG. 8A, the steps 10f to 10i may be inclined. Similarly, in the mandrel 10B shown in FIG. 8B, the arrangement or the number of the parts 10j to 10n with a varying taper angle can be appropriately changed.

In the mandrels 10A and 10B shown in FIGS. 8A and 8B, the diameters of the parts 10a to 10e and 10j to 10n may be set to differ in a linear shape or in a curved shape. The volume of the cavity S may be changed in combination of these shapes.

That is, in the above-mentioned fabrication method, the mandrel 10 having a shape (tapered shape) in which at least the distal end H is thinner than the base end B as a whole can be used so as to take out the mandrel from the molded product (the stick body 1A). Particularly, a mandrel may be used which is obtained by changing the shape of the mandrel 10 within a range in which a thickness (cavity S) necessary for fabricating the stick body 1A can be guaranteed.

When adjusting at least one of the weight distribution, center of gravity, and the weight of the stick body 1A, plural types of mandrels 10 of which the diameter or the diameter variation (taper angle) is gradually changed in the axis direction can be prepared and the volume and the shape of the cavity S can be changed using a selected mandrel 10.

In this case, plural bow sticks 1 can be prepared which have the same outer shape and size and of which the weight distribution, the center of gravity, the weight, and the like are gradually adjusted.

The bow stick 1 according to the invention is not limited to the above-mentioned bow stick formed of CFRP, but a bow stick formed of GFRP or a bow stick formed of a combination of CFRP and GFRP can be used. The invention can be widely applied to bow sticks formed of FRP using a composite material of fiber and resin.

The prepreg 11 is not limited to the thermosetting resin, but may be formed of a thermoplastic resin such as a nylon resin, a polycarbonate (PC) resin, and a polyphenylene sulfide (PPS) resin.

The bow stick 1 may be covered with a woodgrain pattern. As a result, it is possible to obtain an appearance similar to a wooden bow stick.

The outer shape, size, or the like of the bow stick 1 may be changed by changing the shapes of the concave portions 21a and 22a formed in the mold 20 (the lower mold 21 and the upper mold 22).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of fabricating a hollow bow stick body which is used in a stringed instrument and which is formed of fiber-reinforced plastics, the method comprising:
    winding a prepreg, in which a fiber is impregnated with a resin, on a mandrel having a diameter which gradually decreases toward a distal end to form a semi-fabricated product;
    placing the semi-fabricated product and the mandrel, into a mold;
    molding the semi-fabricated product in a shape corresponding to a cavity formed between the mold and the mandrel by heating and pressurizing the semi-fabricated product in the mold to form a molded product;
    removing the mandrel from the molded product to acquire a long and hollow bow stick body; and
    adjusting at least one of a weight distribution, a center of gravity, and a weight of the bow stick body by changing a shape of the cavity using the mandrel of which the diameter or a diameter variation is gradually changed in an axis direction.

2. The method of fabricating a bow stick according to claim 1, wherein when at least one of the weight distribution, the center of gravity, and the weight of the bow stick body is adjusted, the shape of the cavity is changed by preparing a plurality of types of mandrels of which the diameter or the diameter variation is gradually changed in the axis direction and selectively using one mandrel among the plurality of types of mandrels.

3. The method of fabricating a bow stick according to claim 1, wherein an area of the prepreg wound on the mandrel is adjusted in advance on the basis of a shape of the cavity.

* * * * *